(12) United States Patent
Jaidka et al.

(10) Patent No.: US 10,380,155 B2
(45) Date of Patent: Aug. 13, 2019

(54) GENERATION OF NATURAL LANGUAGE NOTIFICATIONS

(71) Applicant: Adobe Inc., San Jose, CA (US)

(72) Inventors: Kokil Jaidka, Bengaluru (IN); Prakhar Gupta, Bangalore (IN); Harvineet Singh, Bengaluru (IN); Iftikhar Ahamath Burhanuddin, Chennai (IN)

(73) Assignee: Adobe Inc., San Jose, CA (US)

( * ) Notice: Subject to any disclaimer, the term of this patent is extended or adjusted under 35 U.S.C. 154(b) by 244 days.

(21) Appl. No.: 15/163,531

(22) Filed: May 24, 2016

(65) Prior Publication Data

US 2017/0346841 A1    Nov. 30, 2017

(51) Int. Cl.
*H04L 29/00*    (2006.01)
*G06F 16/33*    (2019.01)

(52) U.S. Cl.
CPC ................ *G06F 16/3344* (2019.01)

(58) Field of Classification Search
CPC ....... H04L 63/1425; G06F 17/30684
USPC ........................................... 726/23
See application file for complete search history.

(56) References Cited

U.S. PATENT DOCUMENTS

2016/0092695 A1* 3/2016 Novotny ........... G06F 17/30876
726/28

OTHER PUBLICATIONS

Trista Bridges/ Yseop's revolutionary approach to turning data into intelligent text/ Aug. 18, 2014 /http://www.rudebaguette.com/2014/08/18/interview-yseops-john-rauscher-turning-data-intelligent-text/.*
"Automated Insights—Data-driven Writing Platform", Retrieved at: https://automatedinsights.com/—on Mar. 1, 2016, 2 pages.
"Easy-to-Use Artificial Intelligence Software that Writes Like a Human Being", Yseip—Retrieved at: http://yseop.com/EN/home—on Mar. 1, 2016, 5 pages.
"Quill Engage for Google Analytics", Retrieved at: https://www.narrativescience.com/quill-engage—on Mar. 1, 2016, 3 pages.
Bridges,"[Interview] Yseop's revolutionary approach to turning data into intelligent text", Retrieved at: http://www.rudebaguette.com/2014/08/18/interview-yseops-john-rauscher-turning-data-intelligent-text/, Aug. 18, 2014, 4 pages.
Eudes,"The Journalists who never sleep", Retrieved at: http://www.theguardian.com/technology/2014/sep/12/artificial-intelligence-data-journalism-media, Sep. 12, 2014, 5 pages.
Farabee,"5 French Startups to Give Life to Your Customer Analytics", Retrieved at: http://blog.yseop.com/customer-analytics-2/—on Mar. 1, 2016, 6 pages.
Kacprzyk,"Linguistic summarization of time series using a fuzzy quantifier driven aggregation", Fuzzy Sets and Systems 159.12, Feb. 12, 2008, 15 pages.
Krueger,"Which is Better—Push or SMS", Retrieved at: http://www.exacttarget.com/blog/which-is-better-push-or-sms/, Nov. 13, 2013, 4 pages.

(Continued)

*Primary Examiner* — Anthony D Brown
*Assistant Examiner* — Michael D Anderson
(74) *Attorney, Agent, or Firm* — SBMC (57) ABSTRACT

Natural language notification generation techniques and system are described. In an implementation, natural language notifications are generated to provide insight into alerts related to a metric, underlying causes of the alert from other metrics, and relationships of the metric to other metrics. In this way, a user may gain this insight in an efficient, intuitive, and time effective manner.

20 Claims, 6 Drawing Sheets

(56) References Cited

OTHER PUBLICATIONS

Miller,"The Right Brain vs. Left Brain of Marketers [Infographic]", Retrieved at: http://blog.marketo.com/2012/01/the-right-brain-vs-left-brain-of-marketers.html, Jan. 4, 2012, 5 pages.

Moore,"Generating Tailored, Comparative Descriptions in Spoken Dialogue", FLAIRS 2004, May 2004, 6 pages.

Podolny,"If an Algorithm Wrote This, How Would You Even Know?", Retrieved at: http://www.nytimes.com/2015/03/08/opinion/sunday/if-an-algorithm-wrote-this-how-would-you-even-know.html?_r=1, Mar. 7, 2015, 4 pages.

Sweller,"Cognitive Load Theory", Retrieved at: http://www.instructionaldesign.org/theories/cognitive-load.html—on Mar. 1, 2016, 3 pages.

Tolentino,"SMS vs. Push Notification vs. Email: When should your app use what?", Retrieved at: http://thenextweb.com/future-of-communications/2015/02/09/sms-vs-push-vs-email/, Feb. 9, 2015, 9 pages.

Walker,"SPoT: A trainable sentence planner", NAACL, 2001, 2001, 8 pages.

\* cited by examiner

GENERATION OF NATURAL LANGUAGE NOTIFICATIONS

BACKGROUND

Marketers are tasked with increasing the likelihood that a user will interact with digital marketing content and/or other content related to the purchase of a product or service. This is also referred to as conversion.

In order to do so, Marketers first process large volumes of analytics data using computing devices to understand previous consumption patterns and strategize how to increase conversions. This understanding, due to the large volumes of the analytics data, is not possible by the Marketers without use of the computing devices. Analytics data describes past user interaction with a service provider as part of conversion of a product or service. Through processing of this analytics data by the computing devices, the Marketer may select digital marketing content that has exhibited increases in conversion of the product or service. The amount of analytics data that is provided to marketers, however, is ever increasing. Further, marketers typically have a limited amount of time to arrive at actionable insights regarding this data obtained through the processing by the computing devices, e.g., in order to timely provide accurate digital marketing content based on current conditions. Accordingly, an amount of time taken to processing the analytics data by the computing devices may adversely affect the Marketer's ability to gain and take action on this insights.

Conventional techniques used to expose this data, however, are difficult to parse by marketers, especially in the limited amount of time available. For example, although tables and numbers may provide vast amounts of information, significance of these tables and numbers may not be readily evident to the marketers. Further, rapidly changing conditions may limit usefulness of these insights. Accordingly, the ever increasing amounts of data that are made available to the marketers may, in effect, limit the usefulness of this data by an inability to gain insight in a timely manner into what is represented by the data through processing by the computing devices using conventional techniques.

SUMMARY

Natural language notification generation techniques and systems are described. In an implementation, natural language notifications are generated to provide insight into alerts related to a metric (e.g., an insight into a change observed in the user interaction), underlying causes of the alert from other metrics, and relationships of the metric to other metrics. In this way, a user may gain this insight in an efficient, intuitive, and time effective manner.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Conventional techniques used to communicate analytics and other data to users are typically difficult to parse. For example, tables, raw numbers, and so forth may provide a vast amount of information, but this information may not be readily understood by a user. Even if understood, it may be interpreted wrongly if the user is not familiar with what is the information about, or how it was calculated. This is further complicated by situations in which the data may become stale, e.g., due to ever-changing conditions.

Natural language notification generation techniques and systems are described. In the following, these techniques are described in relation to a marketing environment. However, it should be readily apparent that these techniques are equally applicable to a variety of other environments in order to abstract data changes and relationships described by data through use of a natural language notification.

In one example, natural language notifications are employed to fill a gap in understanding of conventional tables and numbers to enable a marketer to readily gain insight into what is represented by these numbers. This enables marketers to address sudden or significant changes by presenting this information in a form that is easily consumable and relevant.

In order to generate the natural language notifications, data is first obtained that describes user interaction with a service provider, e.g., a website that makes goods or services available for purchase. The data is then processed to locate metrics that cause generation of a notification, e.g., through comparison of values of the metrics with defined thresholds. Metrics include data insights, such as those related to changes in dimension data and other quantities observable from the data. These metrics, as well as related metrics, are then used to generate statements (e.g., "facts") describing a relationship of the metrics with each other as well as different aspects of the metrics. For example, for a change in conversion rate over a threshold amount, statements are generated that describe the amount of change, a reference point for the change, possible causes of this change, factors affecting, correlated quantities, and any other information that may be conveyed based on the supplied information. In this way, the different aspects of the metric "conversion rate" as well as relationship to other metrics that may be indicative of a cause of the metric are used to generate these statements.

The statements are then used to form one or more natural language phrases. The statements, for instance, may be used to select from a set of statement templates that include the statements. Continuing with the previous example, a statement template "Sales are up/down by ______ since ______" is selected based on an aspect of the conversion rate metric. This statement template is then filled in with the appropriate metrics and rectified to generate the natural language phrase, e.g., "sales are up by 23% since last year." This process may continue for a plurality of the different aspects of the metric to select a plurality of different statement templates and thus generate a plurality of natural language phrases. Additionally, the process may be configured for multi-lingual support, e.g., through use of templates configured for different languages.

The natural language notification is then output that includes one or more of these natural language phrases. For example, the natural language phrases may be arranged in the notification based on a weighting, e.g., larger or more descriptive phrases are ordered accordingly within the notification. Additionally, user preferences may also be employed to arrange text, order, layout, or dispatch of the natural language notification, such as based on a user's role, profile, or usage information. In this way, the natural language notifications are generated to enable marketers and other users to gain insights usable to control provision of digital marketing content. Further discussion of these and other examples is included in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
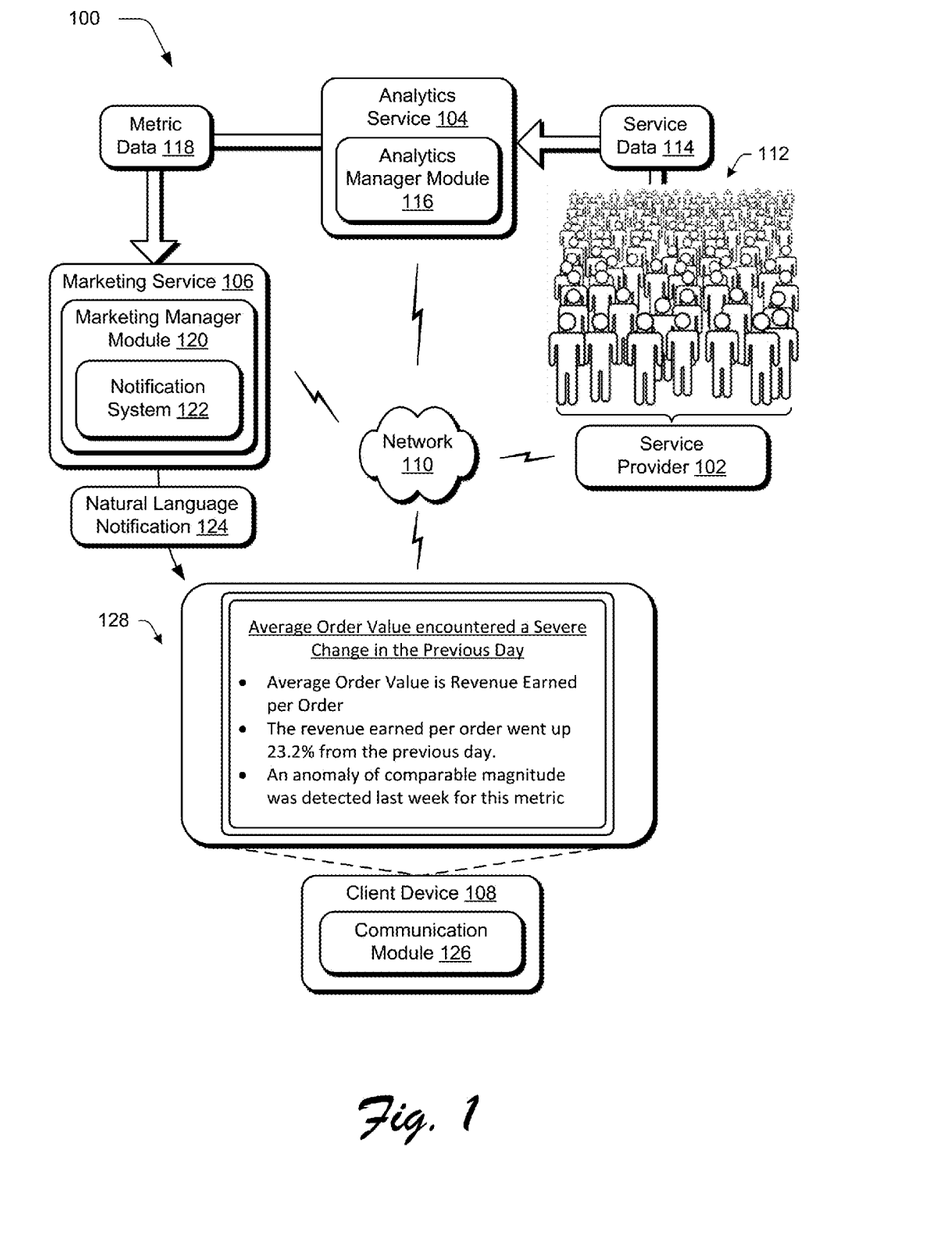
FIG. 1 is an illustration of an environment in an example implementation that is operable to employ natural language notification techniques described herein.

FIG. 1 is an illustration of an environment 100 in an example implementation that is operable to employ natural language notification techniques described herein. The illustrated environment 100 includes a service provider 102, an analytics service 104, a marketing service 106, and a client device 108 that are communicatively coupled, one to another, via a network 110. Computing devices that are usable to implement the service provider 102, analytics service 104, marketing service 106, and client device 108 may be configured in a variety of ways.

A computing device, for instance, may be configured as a desktop computer, a laptop computer, a mobile device (e.g., assuming a handheld configuration such as a tablet or mobile phone as illustrated), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 6.

The service provider 102 is illustrated as implemented at least partially in hardware (e.g., through the use of one or more modules) to provide services accessible via the network 110 that are usable to make products or services available to a user population 112. The service provider 102, for instance, may expose a website or other functionality that is accessible via the network 110 by computing devices of the user population 112, e.g., mobile phones, desktop computers, game consoles, and so forth. In another example, the service provider 102 transmits communications (e.g., emails) to the user population that promote the product or service of the service provider 102.

The analytics service 104 collects service data 114 through use of an analytics manager module 116 that is implemented at least partially in hardware. The service data 114 may describe a variety of information relating to the service provider 104. In one example the service data 114 describes interaction of the user population 112 with the services of the service provider 102. This may include navigation of users through particular webpages of the service provider 102, types of hardware of software used by the user population to access the services, and so on. The service data 114 may also include data that describes operation of the service provider 102, itself. This may include hardware, software, and network functionality of the service provider 102. A variety of other examples are also contemplated, such as interaction of the user population 112 with other service providers.

The analytics service 104 then communicates metric data 118 to a marketing manager module 120 of the marketing service 106. The marketing manager module 120, for instance, may request metric data 118 that describes particular metrics included in the service data 114 collected by the analytics service 104 that are of interest to a marketer. The metric data 118 is then processed by a notification system 122 that is implemented at least partially in hardware to generate a natural language notification 124.

The natural language notification 124 is configured to convey information relating to metrics collected as part of the metric data 118. This may include notification of changes to operation of the service provider 102, user interactions, alerts generated for detected deviations in values of metrics over a defined threshold, and so forth. The natural language notification 124 is communicated via the network 110 to a client device 108 for output by a communication module 126 within a user interface 128, e.g., as an email, instant message, display within a browser or other network-enabled application, and so on.

As previously described, marketers are typically confronted with large amounts of data in a limited time to arrive at actionable insights. Examples of such insights are sudden or significant changes in web metrics at present, predictions of changes in future, and so forth. Accordingly, in the following the natural language notification 124 is configured to capture and to generate information in a form that is easily consumable and relevant to the marketer. This may include a summary of the data changes in the metric data 118 at a high level, which may also highlight the key noticeable trends and relationships. As illustrated for the displayed natural language notification 124 in the user interface 128, a high level of "Average Order Value encountered a Severe Change in the Previous Day" gives a user of the client device 108 high level insight to a purpose of the notification. The natural language notification 124 also includes a context to this insight in bulleted points below and may even include possible causes as further described in relation to FIG. 2.

The notification system 112 may also incorporate user preferences in selection, layout and detail-orientation of the natural language notification 124. For example, not all information may be relevant for every user. For example, an analytically-trained user may desire detailed information, broken down into its various contributing dimensions. However, a user trained in business may desire a cursory alerting of some numbers, with more focus on a different set of metrics. Thus, different users may have different objectives regarding what is included in the natural language notification 124. This may include different set of metrics to be alerted, or different levels of detail in terms of the granularity of the time series (e.g., hourly or daily) or in terms of other data attributes (e.g., different levels of granularity for geographic locations) for a single set of metrics. Furthermore, notifications may be configured for different languages or different vocabularies, depending on the location or the industry for which this alert is prepared.

Additionally, depending on the desired style of quantitative analysis of the user, textual or visual descriptions may be employed as part of the natural language notification 124. In this way, the natural language notifications 124 described in the following address the actionable, functional needs and the personal preferences of the users. This functions to fine tune a level of detail to share about a metric and its trends, as well as its relationship with other metrics being tracked. Further discussion of generation of the natural language notification 124 by the notification system 122 is described in the following.

Figure 2:
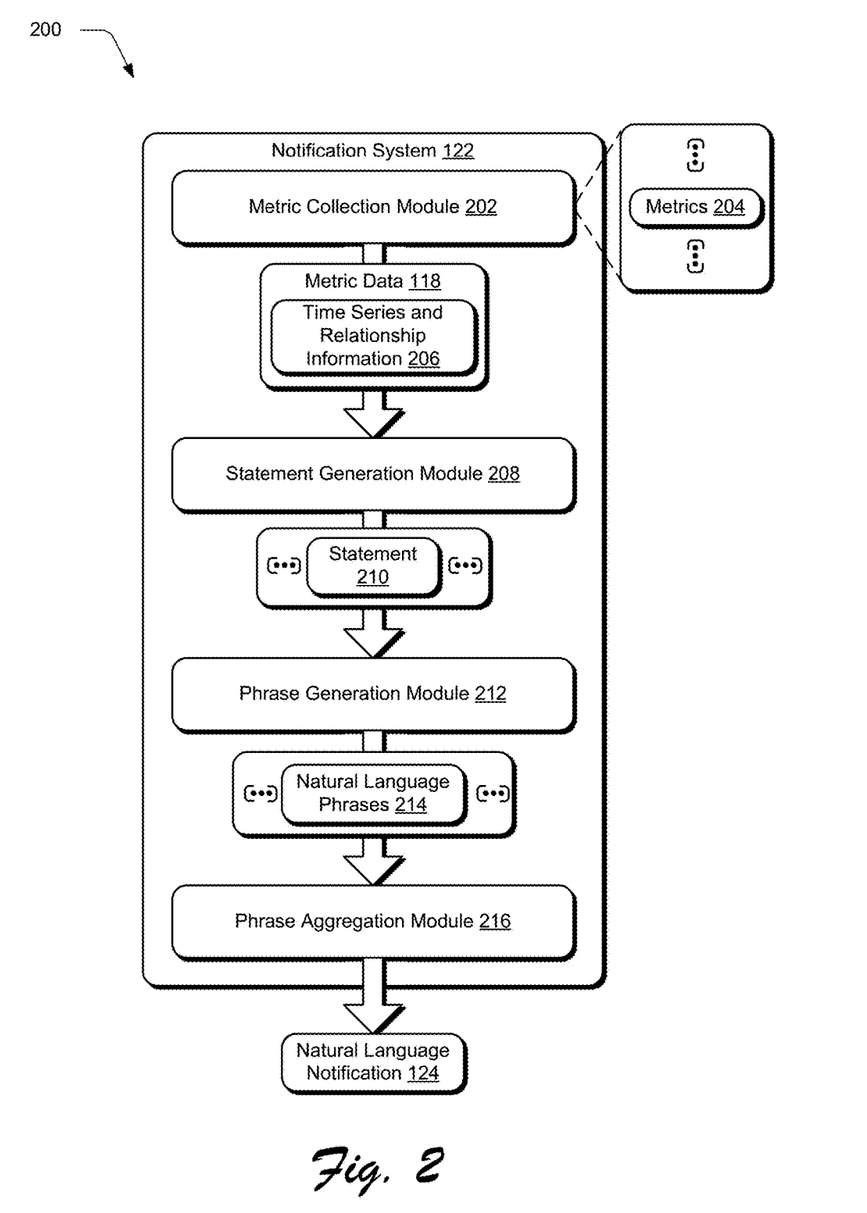
FIG. 2 depicts a system showing operation of a notification system of FIG. 1 in greater detail.

FIG. 2 depicts a system 200 showing operation of the notification system 122 of FIG. 1 in greater detail. A change in one metric is often related to another. Conventionally, the onus is on the user in order to identify this relationship. The notification system 122 described herein, however, is configured to determine and express relationships between metrics as a meaningful natural language description. In the following, the natural language notification 124 is described in relation to a marketing environment and metrics refer to website metrics. However, it should be readily apparent that the techniques described herein are equally applicable to a wide range of time varying metrics, such as server usage logs, hardware performance logs, and so forth.

To begin, the notification system 122 includes a metric collection module 202 that is implemented at least partially in hardware to collect metric data 118 for metrics 204. Metrics 204 may define any measurable characteristic, e.g., page views, network bandwidth, processor load, amount of memory storage, navigation pattern through digital content, and so forth. The metrics 204 are used as a basis to form the natural language notification 124. The metric data 118, for instance, may be configured as time series and relationship information 206 for the metrics 204 reported by the analytics service 104 of FIG. 1. The metric data 118 may also include data related to the metrics obtained from sources other than the service provider 102, such as from related service providers, network 110 functionality, and so forth.

Relationships between metrics may be pre-defined or dynamically derived by the metric collection module 202, e.g., through semantic analysis. In a pre-defined example, different types of tags are assigned automatically to each metric. From this, relationships between metrics may be readily determined based on these tags. For instance, semantic tags may be used to describe a type of user interaction with the service provider 102 for a metric. Types of user interactions include "search click past event," "search click through," "search click," and so forth.

In another instance, functional tags are used that describe a type of information being tracked by the metric and thus a relationship between the data associated with a functional tag as well as data associated with other functional tags. Examples of functional tag description include "e-commerce traffic," "screen rendering," "geographic location," and so forth. In a further instance, customer journey tags are used to describe a journey through digital content by a user. Examples of journey tags include description of a stage in a conversion scenario, browsing of particular items of digital content of the service provider 102 (e.g., webpages), purchases from the service provider 102, and so forth. In yet another instance, persona tags are used to describe a type of user that is typically interested in a respective metric. Examples of persona tags include business roles or other demographic information. A variety of other tag types are also contemplated, such as resource tags describing resources used as part of consumption that is described by a metric, such as hardware, software, or network resources.

From this metric data 118, a statement generation module 208 is implemented at least partially in hardware to generate statements 210 regarding the metrics 204. The statements 210 act as meta-information to highlight trends exhibited by the metrics 204. Examples of statements include historical value of a metric 204 at different reference points (e.g., in time) for comparison purposes, anomaly history and contribution analysis, relationships between metrics 204 based on pre-specified information or semantic similarities between metric names or descriptions, and so forth.

Thus, statements 210 are the pieces of meta-information used to create an explanation for different aspects of a metric 204, and other information related to the metric 214, such as the number of times it has had an anomalous value, and so on. An example of a list of statements 210 to be generated for a single metric is included in the following table.

| Statement | Example statement template | Comments |
|---|---|---|
| Total anomalies | "A total of _anomalies were detected" | Provided from anomaly detection source, e.g., the service provider 102, analytics service 104, or marketing service 106 |
| Related anomalies | 1. "Possibly related anomalies:" 2. "The anomalies in related metrics are" | Provided from the source which provides key anomalies |
| Percent change/ Severity | 3. "up 16% as compared to the average/last week" 4. "large increase", "small dip" | Based on stored values of metrics for a fixed amount of time for comparison of values. |
| Reference point/ multiple reference points | 1. "as compared to last April/last week/last year/average" 2. Last year/week/month, this value was . . . 3. Graph | Used to decide what reference point to consider for comparison of a metric's values. |
| Look-up table for description | "This metric calculates the . . . " | Provides a full description of the metric for increased understanding. |
| Contribution analysis | "Major contributors to this anomaly are . . . " | To provide contribution analysis |
| Causal analysis | "This anomaly is driven by . . . " | To provide causes for change in the metric |
| Anomaly history | "This anomaly last occurred . . . " "This anomaly maintained its position . . . " | To give information regarding how many times and when an anomaly occurred for the metric. |
| Suggested anomalies | "We also found the following anomalies which you have not been tracking, but they are severe anomalies: . . . ". | To suggest some metrics which the user might want to track. |
| Explanation of suggestions | "This is based on your interest in . . . " | The factors which triggered the suggestion |

A variety of techniques may be employed to obtain values for each of the statements 210. Examples of such techniques include processing by the statement generation module 208, an API call to another service provider or database, and so forth. For each metric 204, the statement generation module 208 tests which statements 210 can be created and what information is available before generating a set of possible statements, referred to as "Sp" in the following.

The statement generation module 208 then selects a sub-set of statements 210 from a set of possible statements 210, e.g., to explain an anomaly. Selection may be based on a variety of criteria. Examples of such criteria include permissible length of the natural language phrases 214 or natural language notification 124, permissible amount of information for a metric, user persona for whom the report is intended and user customization preferences, and so forth. This results in the selected set of statements, "Ss".

A phrase generation module 212 is implemented at least partially in hardware to accept the selected set of statements 210 as inputs. From these inputs, the phrase generation module 212 generates natural language phrases 214. The phrase generation module 212, for instance, may be configured to select appropriate statement templates based on the received statements 210. The statement templates are then completed using the statements 210 and rectified to form natural language phrases 214. For example, the statements 210 "20%" for a metric "conversion rate" that has increased are inserted into a statement template of "The conversion rate has shown a _________ increase/decrease." The filled in statement template is then rectified by the phrase generation module 212 to follow proper language forms, e.g., "The conversion rate has shown a 20% increase."

For example, the phrase generation module 212 may employ heuristics to take the selected set of statements "Ss" as an input and process it to output a set of appropriate statement templates. This is performed by detecting the presence of various statements 210 in "Ss", which is then used as a basis to select applicable statement templates. The phrase generation module 212, for instance, may employs rules in the form of the following: "if values of facts {A1, A2, . . . , An} are present, then choose template Tk."

The rules have an assigned priority order, i.e., a hierarchical relationship. If a rule is satisfied, then, to reduce duplication of information, a subset of rules is removed from further checks and only the remaining rules are checked for selecting further templates. On such example is described as follows:

Check if values are present for following statements: key anomaly A, related anomaly B, number of times anomaly A occurred in last month, number of times related anomaly B occurred in last month; and If the values for these statements are present, the statement template selected is "An anomaly was detected on Metric A, $ times in last month, while its related metric had an anomaly $ times."

The statements templates thus selected, along with the statements 210 and the values for the statements 210, are used to create the natural language phrases 214 as follows.

The phrase generation module 212 then inserts values of the statements 210 within the statement templates at appropriate slots. For example, slots are positions within the templates marked as using "$" in the following.

1. Overall Alert Suite Description
   a. Of the total $ metrics, anomalies were found in $ metrics since $.
   b. A total of $ metrics were analyzed and anomalies were detected in $ metrics.
2. Metric Description Examples
   a. Hits—Total number of hits sent to the analytics service 104. This metric sums hit types (e.g., page views, event, timing, and so forth).
   b. sessionDuration—The length of a session measured in seconds and alerted in second increments.
3. Comparisons/Reference
   a. $ is up/down $% since $.
   b. $ is continues to climb/grow/rise over $.
   c. The values of $ has increased/decreased/changed $%
      i. Traffic from Affiliate continues to climb/grow/rise over week, and is up from April.
      ii. Revenue: $264,087 (up 16%, significant compared to historical averages). iii. Revenue is up 20% compared to May 2013. It's also the highest revenue has ever been at this point in any 2nd Quarter.
4. Anomaly History
   a. The metric hits encountered (another anomaly)/$ anomalies in the last $(time period).
   b. The metric $ encounters anomaly every $.
   c. We have found $ anomalies in the metric since you started tracking it.
5. Contribution
   a. Major contributors to this anomaly are $
   b. $ are the major contributors to $.
   c. $ is driven by $.
6. Overall Review of Important Metrics
   a. Increases in $ observed in the past $.

As part of filling the statement template, the phrase generation module 212 makes lexical choices based on conditions in order to rectify the statement 210 into a proper language form. For example, in the following template "The value of the metric $1 changed from $2 to $3," for $1 the phrase generation module 212 uses "increased" and "decreased" otherwise. Other forms of lexical choices include use of different phrases or words, e.g., using "went up" instead of "increased". Other kind of considerations undertaken by the phrase generation module 212 include deciding the form of word, its tense, singular vs plural and other morphological considerations, spelling, capitalization, breaks between words, punctuation, and other orthographical considerations.

The natural language phrases 214 are then processed by a phrase aggregation module 216 that is implemented at least partially in hardware to form the natural language notification 124 from the natural language phrases 214. The phrase aggregation module 216, for instance, may select from the natural language phrases 214 to arrive at a set of phrases that best represent an underlying purpose of the notification as well as remove repetition.

For example, phrases may express a same concept to different degrees and thus the natural language phrase 214 that expresses this concept to the lesser degree may be removed from consideration as part of the natural language notification 124. A first natural language phrase, for instance, may indicate that "The conversion rate has shown a 20% increase" as previously described. A second natural language phrase, on the other hand, may indicate that "The conversion rate has shown a 20% increase over the past quarter since introduction of the buy one/get one free marketing campaign." Accordingly, the second natural language phrase 214 is chosen for inclusion in this example whereas the first natural language phrase is not.

The phrase aggregation module 216 may also employ functionality to reduce repetition in the natural language phrases 214. An example of this is use of co-reference resolution using pronouns. Therefore, instead of using an actual name of the metric 204, "the metric" or "it" may be used as part of the natural language phrase. In another example, the natural language phrase 214 generated for the natural language notification 124 may be stored in a temporary storage buffer while notification is being generated. In this way, repetition of lexical choices may be avoided such that different words and phrases are chosen to describe successive anomalies.

The phrase aggregation module 216 may also be configured to personalize the natural language notification 124 based on one or more user preferences. The phrase aggregation module 216, for instance, may be made aware of a potential viewer of the natural language notification 124 and select natural language phrases 214 consistent with user preferences of that viewer. User preferences may be based on a user's role, profile, or usage information that is to receive the natural language notification. As previously described, different users may desire different levels of detail, use of different metrics to describe an underlying condition, and so on. Accordingly, configuration of the natural language notification 124 based on these considerations increases usefulness of the notification to a wider range of users. Similar functionality may also be incorporated as part of the phrase generation module 212 to generate phrases based on user preferences.

The natural language notification 124 is then output by the notification system 122 for display in a user interface. As part of this, the natural language notification 124 may include an embedded module configured to collect feedback from recipients of the notification. This feedback may be employed in a variety of ways, such as to change a weighting regarding how natural language phrases 214 are chosen for inclusion in the natural language notification 124 by the phrase aggregation module 216.

Figure 3:
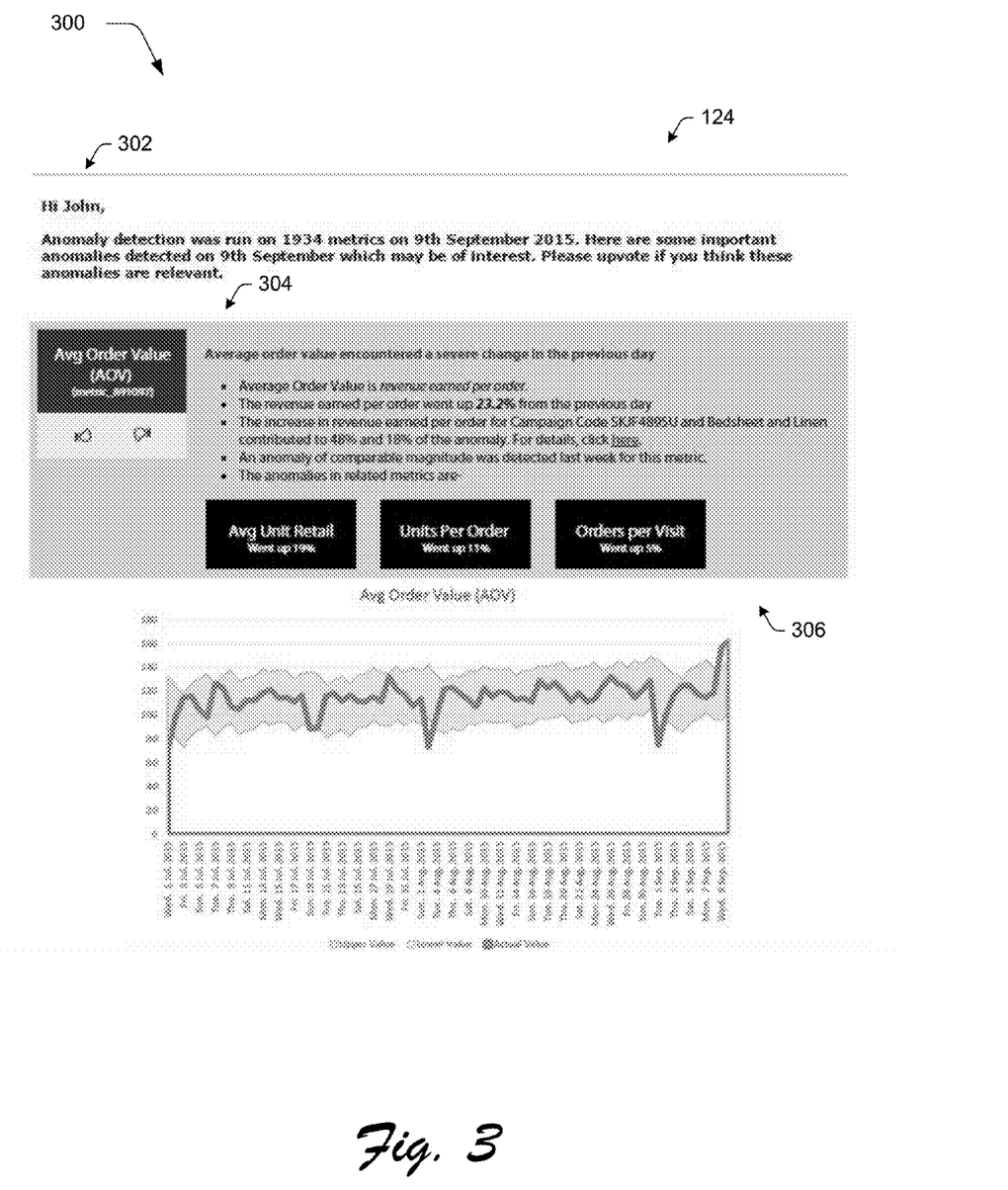
FIG. 3 depicts an example implementation of a natural language notification as output in a user interface.

FIG. 3 depicts an example implementation 300 of a natural language notification 124. The natural language notification in this example is personalized based on user preferences. As illustrated, the notification is addressed to a particular user 302 and has a level of detail and language usage based on the user's role, profile, or usage information.

The natural language notification 124 also indicates a respective metric 304 that is a subject of the notification and includes information regarding different aspects of that metric. As illustrated, the metric "average order value" is illustrated along with aspects of the metric, such as how the metric is formed, values of the metric, products relating to the metric, and so forth.

The natural language notification 124 also includes indications of potential causes 306 of an alert that caused formation of the notification. For example, the illustrated natural language notification 124 is generated responsive to comparison of values of a metric "average order value" with a threshold. The notification system 122 also determines potential contributing causes 306 of this condition, examples of which include average unit retail went up 19%, units per order went up 11%, and order per visit went up 5%. The contributing causes 306 may be determined in a variety of ways, such as based on variation in trends exhibited by these metrics over time, semantic relationships, and so forth.

Accordingly, the natural language notification 124 provides data descriptions based on the indexed descriptions of the metrics 204 being tracked by the user. Given a set of pre-selected metrics 204 and values, which are to be included in the natural language notification 124, these techniques provide a way to construct a message that explains this data in plain language, along with the pre-specified (or automatically identified) relationships between the chosen metrics. These techniques are further usable to generate a human consumable message which provides a set of statements 210 about the metrics 204, meta-information, observed trends or fluctuations in their observations, and observed relationships with other metrics and dimensions. The techniques may be used to calculate metric relationships between metrics, which may be pre-calculated or identified based on semantic similarities between metric descriptions.

Additionally, contextual information is provided to link the metrics with the trends in data over a different period of time. This may be used to link trends in news and trends as compared to popular metrics, filters and granularities which have been typically used for reporting, and so forth. Further, explanations may be tendered for information included in the notification, such as if the user is receiving a notification based on a metric regarding prior usage, preferences in notifications, or even based on the usage and/or preferences of other similar users. Complementary information in the form of suggested actions, relevant links and images/graphs may be provided for better understanding of the alerted metric. Further, as described above customization of the text, arrangement, order, layout and dispatch of the notification may be employed. As such, the natural language notification 124 is customized according to the preferential order, device usage, browsing behavior and time preferences, implicitly or explicitly specified by the user. Cognitive loading concepts may also be applied by the phrase aggregation module 216 to manage how text and graphs complement each other in an alert message. For example, anomalous changes in data may be depicted graphically in a meaningful way that relates to the textual description.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-3.

Figure 4:
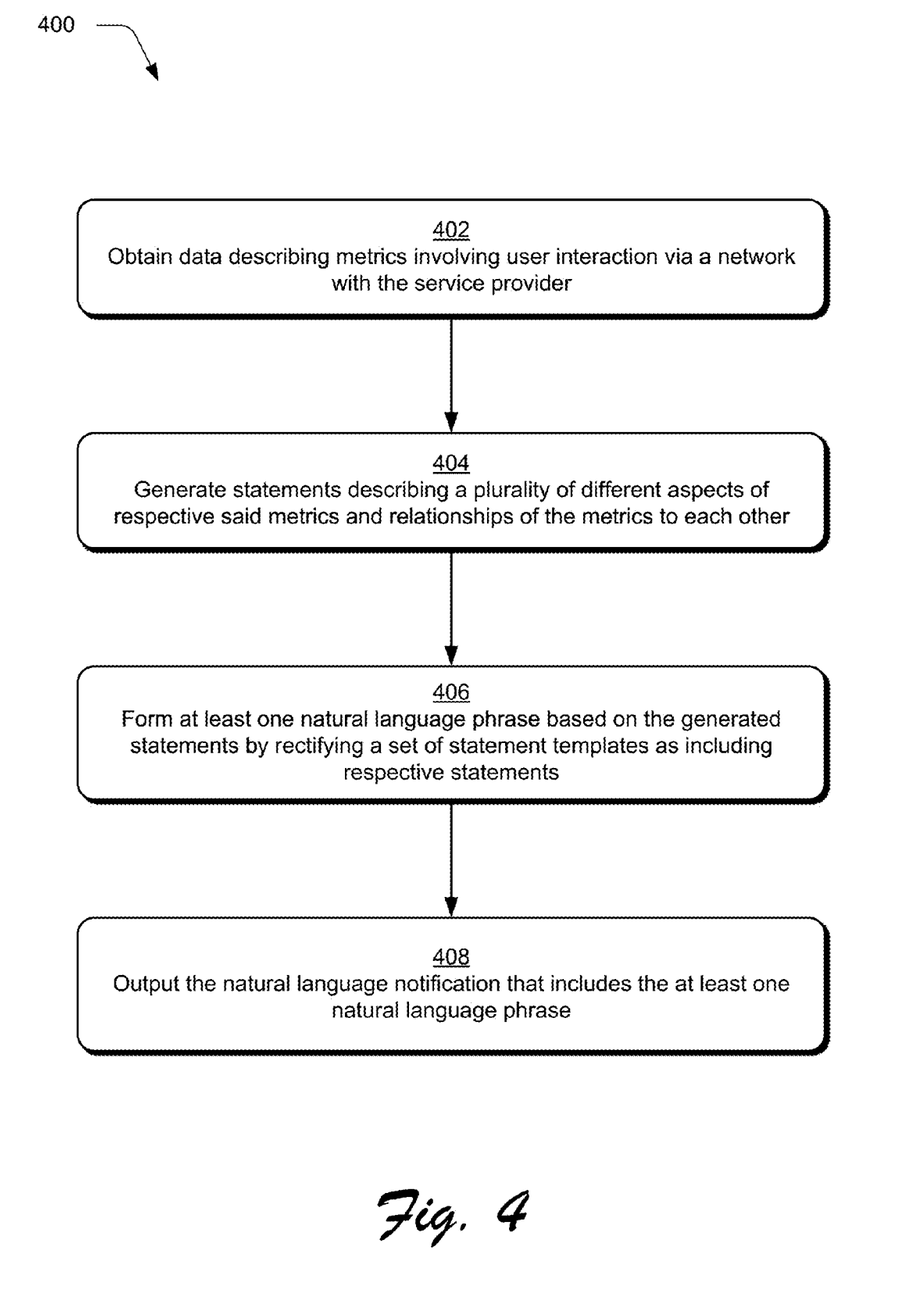
FIG. 4 is a flow diagram depicting a procedure in an example implementation in which natural language notifications are generated based on user interaction with a service provider.

FIG. 4 depicts a procedure 400 in an example implementation in which natural language notifications are generated. Data is obtained describing metrics involving user interaction via a network with the service provider (block 402). The data, for instance, may include metric data 118 obtained from an analytics services, directly from a web site of a service provider 102, and so forth.

Statements are generated describing a plurality of different aspects of respective said metrics and relationships of the metrics to each other (block 404). The statements 210, for instance, may be generated by the statement generation module 208 to describe trends, alerts, and so forth exhibited by the data.

At least one natural language phrase is formed based on the generated statements by rectifying a set of statement templates as including respective said statements (block 406). Statements 210 of "conversion rate," "increase" and "15", for instance, may be inserted into a statement template having "blanks" that correspond to those statements. The filled-in statement templates are then rectified into proper language forms, redundancies are removed, and so forth.

A natural language notification is output that includes the at least one natural language phrase (block 408). The phrase aggregation module 216, for instance, may generate the natural language notification 124 by selecting form the natural language phrases 214. This may also include further rectification of these phrases, such as to remove redundancies between phrases. Supplementary information may also be included, such as graphs, charts, and so on that are generated automatically based on values of the metrics 204, which may provide further insight to a user.

Figure 5:
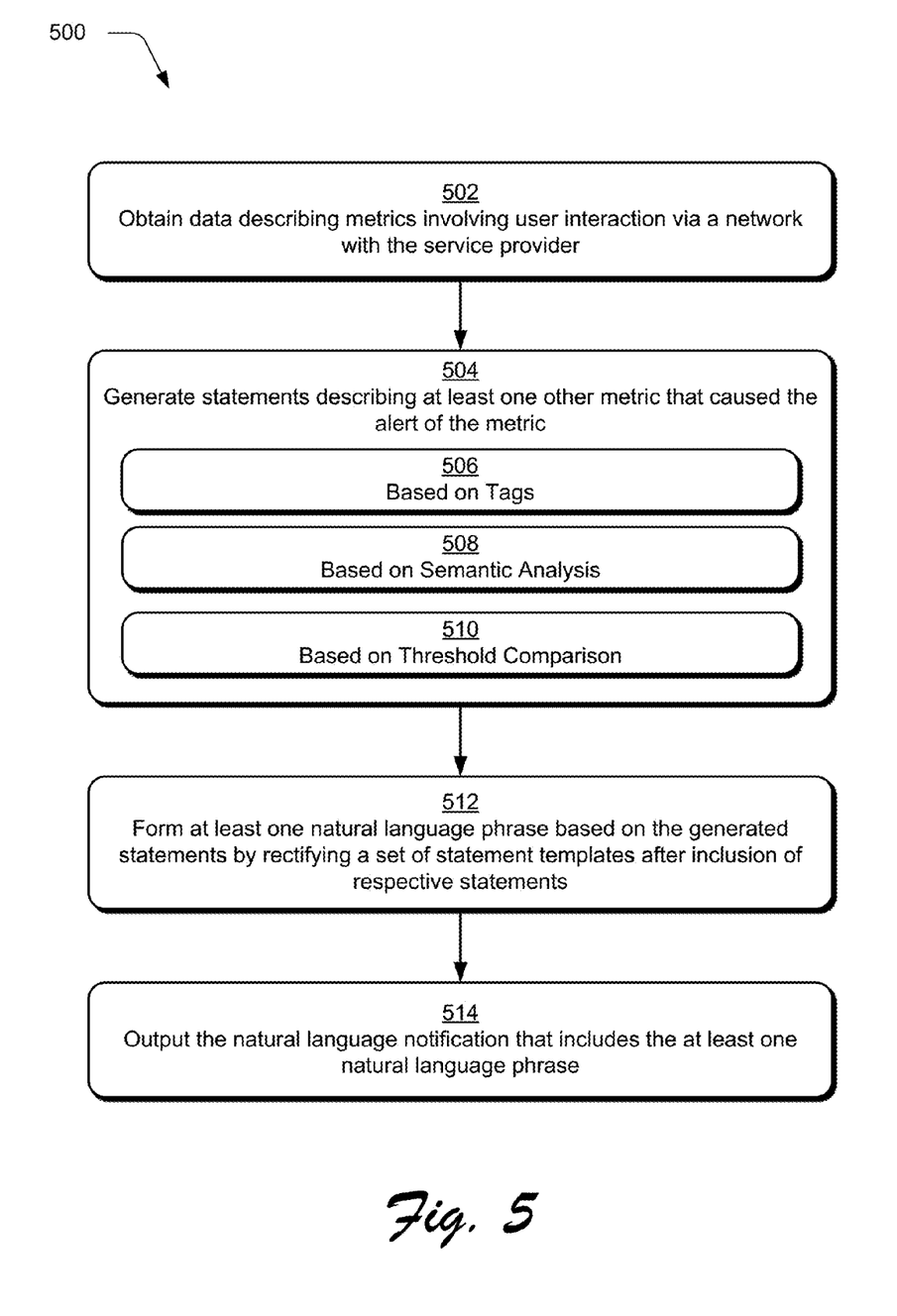
FIG. 5 is a flow diagram depicting a procedure in an example implementation in which natural language notifications are generated based on an alert.

FIG. 5 depicts another procedure 500 in an example implementation in which natural language notifications are generated based on user interaction with a service provider. Data is obtained describing an alert involving a comparison of a metric of the service provider with a threshold (block 502). For example, a determination may be made that one or more metrics 204 have values that depart from a baseline by more than a threshold amount. This may include instances of increases of sales, drops in network traffic, and so forth.

Statements are generated describing at least one other metric that caused the alert of the metric (block 504). The at least one other metric may be identified in a variety of ways. In one example, the other metric is based on tags (block 506), such as through use of the semantic functional, customer journey, or persona tags previously described. In another example, the other metric is based on a semantic analysis (block 508), such as to determine related metrics to the metric that involves the alert. In a further example, the other metric is identified based on a threshold comparison (block 510), such as another metric that while not exceeding a threshold has approached the threshold. In another example, a threshold of a related metric is adjusted based on the alert. For example, the average order value metric of FIG. 3 may exceed a threshold. Accordingly, thresholds used for related metrics such as average unit retail, units per order, order per visit and other may be lowered in order to detect changes to these other metrics. A variety of other examples are also contemplated.

At least one natural language phrase is formed based on the generated statements by rectifying a set of statement templates as including respective said statements (block 512). A natural language notification is output that includes the at least one natural language phrase (block 514). The selection of statement templates, rectification, and selection of phrases for inclusion as part of the notification may proceed as described above.

Example System and Device

Figure 6:
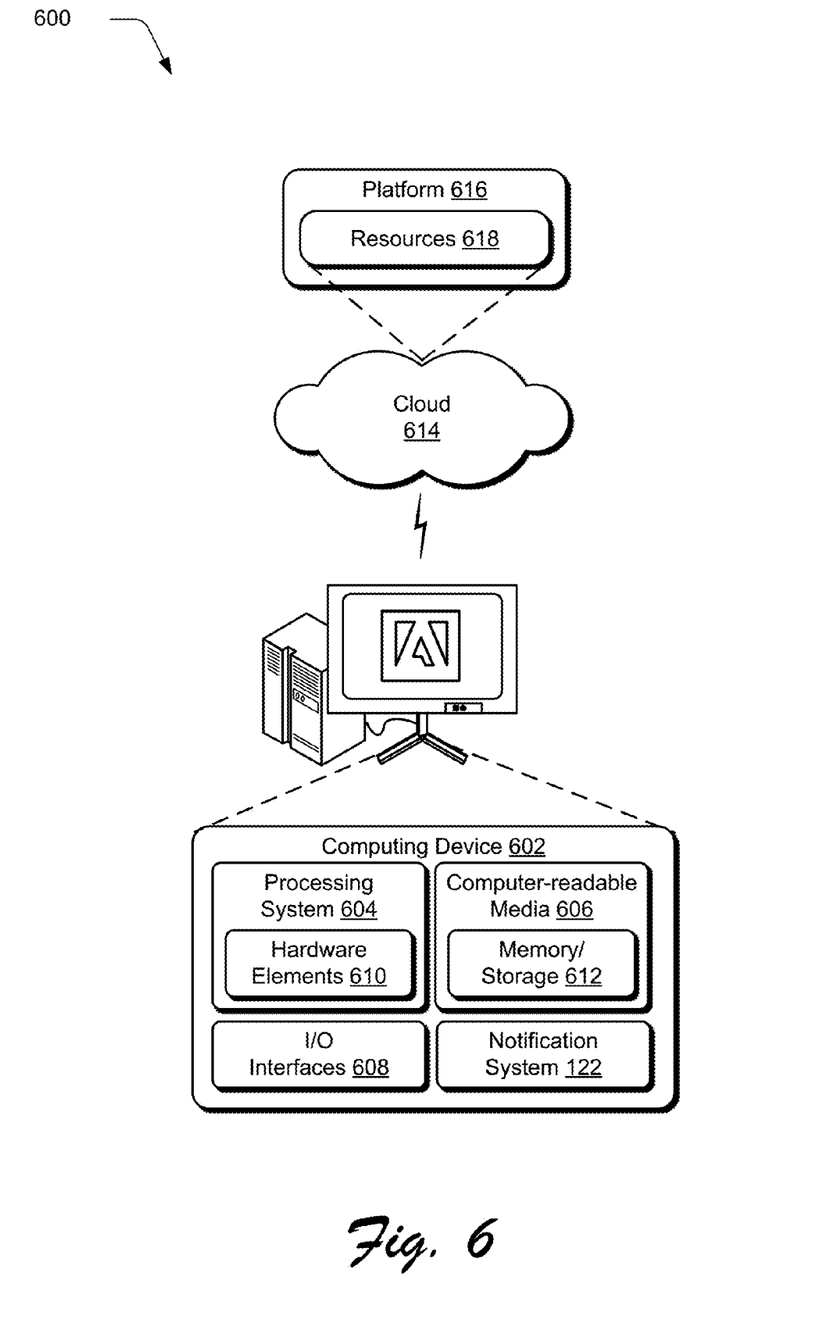
FIG. 6 illustrates an example system including various components of an example device that can be implemented as any type of computing device as described and/or utilize with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the notification system 122. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data.

Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to control output of a natural language notification regarding a service provider, a method implemented by at least one computing device, the method comprising:
   obtaining, by the at least one computing device, metric data describing metrics involving interaction of a user population via a network with the service provider, the user population including multiple users;
   generating, by the at least one computing device, statements describing a plurality of different data changes or trends of respective said metrics and relationships of the metrics to each other;
   determining one or more user attributes of a user to which the natural language notification is to be output;
   forming, by the at least one computing device, at least one natural language phrase based on the generated statements by rectifying a set of statement templates as including respective said statements, said rectifying including selecting, based on the one or more user attributes and from multiple different available levels of detail for describing the statements, a level of detail for describing the statements in the at least one natural language phrase; and
   outputting, by the at least one computing device, the natural language notification that includes the at least one natural language phrase.

2. The method as described in claim 1, wherein the metrics describe at least one metric-to-be-reported, in operation of the service provider or an insight into a change observed in the user interaction.

3. The method as described in claim 1, wherein the generating of the statements is based at least in part on types of tags assigned to respective said metrics.

4. The method as described in claim 3, wherein the types of tags include:
   semantic tags describing a type of user interaction with the service provider;

functional tags that describe a type of information being tracked by a respective said metric;

customer journey tags describing a journey through digital content by a user in relation to a respective said metric; or persona tags describing a type of user that is typically interested in a respective said metric.

5. The method as described in claim 1, wherein the metric data describes metrics involving operation of the service provider as part of making a product or service available for conversion via the network.

6. The method as described in claim 1, further comprising aggregating a plurality of said natural language phrases to form the natural language notification.

7. The method as described in claim 1, further comprising referencing complementary information in the natural language notification based at least in part on the metrics included in the metric data.

8. The method as described in claim 1, further comprising arranging text, order, layout, or dispatch of the natural language notification based on at least one user preference.

9. The method as described in claim 8, wherein the at least one user preference is based on a user's role, profile, or usage information that is to receive the natural language notification.

10. The method as described in claim 1, wherein the metric data describes the metrics through use of a value of the metric and a timestamp and the relationships of the metrics to each other include a cause behind at least one of the relationships based on the metric data over time.

11. In a digital medium environment to control output of a natural language notification regarding a service provider, a method implemented by at least one computing device, the method comprising:

obtaining, by the at least one computing device, metric data describing an alert involving a comparison of a metric of the service provider with a threshold;

generating, by the at least one computing device, statements describing data changes or trends of at least one other metric that has a likelihood of causing the alert of the metric;

forming, by the at least one computing device, at least one natural language phrase based on the generated statements by rectifying a set of statement templates after inclusion of respective said statements, said forming including:

determining that multiple natural language phrases are formable by said rectifying; and selecting the at least one natural language phrase based on determining that the at least one natural language phrase provides more detail describing the generated statements than a different natural language phrase that is formable by said rectifying; and outputting, by the at least one computing device, the natural language notification that includes the at least one natural language phrase.

12. The method as described in claim 11, wherein the generating of the statements is based at least in part on types of tags assigned to respective said metrics.

13. The method as described in claim 12, wherein the types of tags include:

semantic tags describing a type of user interaction with the service provider;

functional tags that describe a type of information being tracked by a respective said metric;

customer journey tags describing a journey through digital content by a user in relation to a respective said metric; or persona tags describing a type of user that is typically interested in a respective said metric.

14. The method as described in claim 11, wherein the generating of the statements is based at least in part on semantic analysis that identifies a relationship between the metric and the at least one other metric.

15. The method as described in claim 11, wherein the generating of the statements is based at least in part on comparison of values of the at least one other metric to a threshold.

16. In a digital medium environment to control output of a natural language notification regarding a service provider, a system comprising:

a metric collection module implemented at least partially in hardware to obtain metric data describing metrics involving user interaction of a user population via a network with the service provider the user population including multiple users;

a statement generation module implemented at least partially in hardware to generate statements describing a plurality of different data changes or trends of respective said metrics and relationships of the metrics to each other;

a phrase generation module implemented at least partially in hardware to form at least one natural language phrase based on the generated statements by determining a set of fact values that are present in the statements, selecting a set of statement templates that apply to the fact values, and rectifying the set of statement templates after inclusion of respective said statements to form the at least one natural language phrase.

17. The system as described in claim 16, wherein the metrics describe at least one anomaly in operation of the service provider.

18. The system as described in claim 16, wherein the metric data describes metrics involving operation of the service provider as part of making a product or service available for conversion via the network.

19. The system as described in claim 16, wherein the statement generation module is configured to generate the statements based at least in part on types of tags assigned to respective said metrics.

20. The system as described in claim 16, wherein the metric data describes the metrics through use of a value of the metric and a timestamp and the relationships of the metrics to each other include a cause behind at least one of the relationships based on the metric data over time.

* * * * *